May 14, 1963   A. CSIZMANSKY   3,089,719
POWER OPERATED LATCH FOR CONVERTIBLE TOPS
Filed July 22, 1960   2 Sheets-Sheet 1

INVENTOR.
ALEX CSIZMANSKY
BY
Dale A. Winnie
ATTORNEY

May 14, 1963  A. CSIZMANSKY  3,089,719
POWER OPERATED LATCH FOR CONVERTIBLE TOPS
Filed July 22, 1960  2 Sheets-Sheet 2

INVENTOR.
ALEX CSIZMANSKY
Dale A. Winnie
ATTORNEY

United States Patent Office 3,089,719
Patented May 14, 1963

3,089,719
POWER OPERATED LATCH FOR CONVERTIBLE TOPS
Alex Csizmansky, Dearborn, Mich., assignor to Dura Corporation, Oak Park, Mich., a corporation of Michigan
Filed July 22, 1960, Ser. No. 44,705
1 Claim. (Cl. 292—25)

This invention relates to closure mechanisms in general and more particularly to a mechanism adaptable for use in engaging and disengaging an automotive convertible top, or the like, to the windshield header bar, or like structure, of an automotive vehicle.

Most convertible top mechanisms, for automotive vehicles are power actuated and fully automatic. The soft top of such vehicles is readily and conveniently raised into a vehicle closing relation and retracted into a nested position. Certain vehicles also include an automatically operated and coordinated boot closure for covering and protecting the top when retracted and housed within the vehicle body. The only mechanical labor required is in engaging and disengaging the convertible top from the windshield header bar subsequent to the erection of the top or preceding the retraction thereof.

It is an object of this invention to provide a simplified closure mechanism particularly adaptable for power actuation and use as a convertible top latching mechanism.

It is also an object of this invention to teach a closure mechanism particularly suited for use in retaining a convertible top to a windshield header bar and including positive locking and simultaneously actuated catches for securely retaining one member in edge engaging relation to another.

It is another object of this invention to teach a power actuated closure mechanism for use with convertible tops, and such as is retained within an enclosed housing capable of being carried by the leading bow of the convertible top structure and is sufficiently compact and shallow to avoid obstructing visibility through the vehicle windshield.

It is a further object of this invention to disclose and teach an automatic closure mechanism for convertible tops which provides a compact assembly, including a minimum of parts of durable and sound construction, and that is capable of manufacture and sale in competition with like mechanical means within a reasonable price range commensurate with the advantages and conveniences obtained.

These and other objects and advantages obtained in the practice of this invention will be more apparent upon a reading of the following specification in regard to a working embodiment of this invention, and upon a study of the appended drawings.

Figure 1:
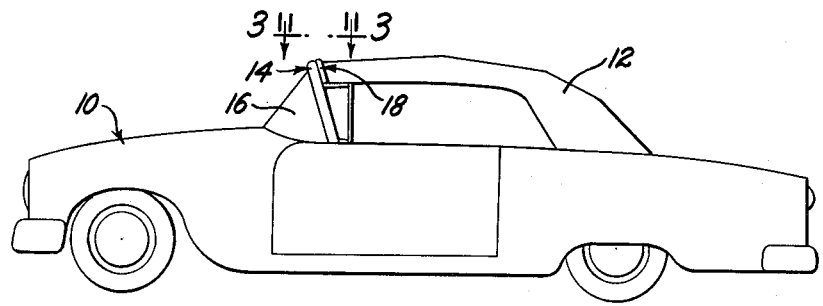
FIGURE 1 is a side view of an automotive vehicle having a convertible top including the closure mechanism of this invention.

The automotive vehicle 10, shown by FIGURE 1 includes a convertible top 12. The vehicle enclosing top structure is shown as erected and engaged to the windshield header bar 14. The windshield header bar extends around the upper and side edges of the windshield 16 and receives the leading edge 18 of the convertible top structure in engagement therewith.

The closure mechanism 20 of this invention is disposed within the vicinity of the leading edge 18 of the convertible top structure and the horizontally disposed portion of the windshield header bar 14. The closure mechanism 20 is actually, in this instance, a part of the convertible top structure 12. Such mechanism is shown in dotted outline by FIGURE 2 to include a power source 22 connected to an operative member 24 which is in turn engaged by connecting links 26, to catches 28 and 30 which are disposed in relative spaced relation to each other and on opposite sides of the centrally disposed catch actuating mechanism.

The closure mechanism 20 includes a housing structure 32 which extends across the convertible top 12 and is relatively shallow and narrow to avoid obstruction as regards visibility through the windshield 16. The elongated housing structure 32 may be formed to follow the general contour of the engaging top and header bar structures and may include some camber.

Figure 2:
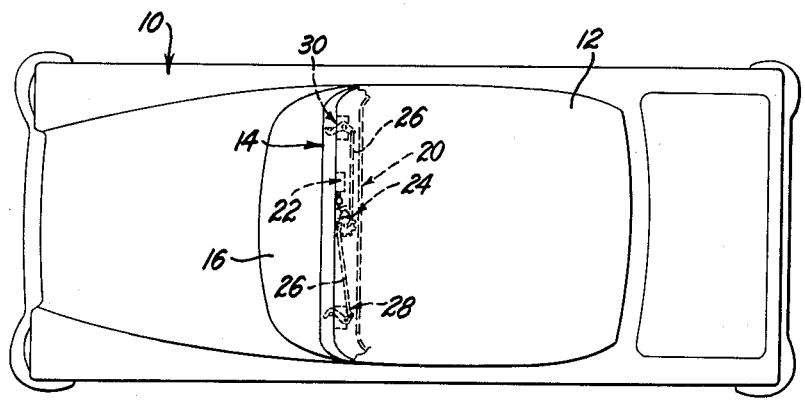
FIGURE 2 is a top view of the automotive vehicles of FIGURE 1 and showing the closure mechanism of this invention in dotted outline thereon.
Figure 3:
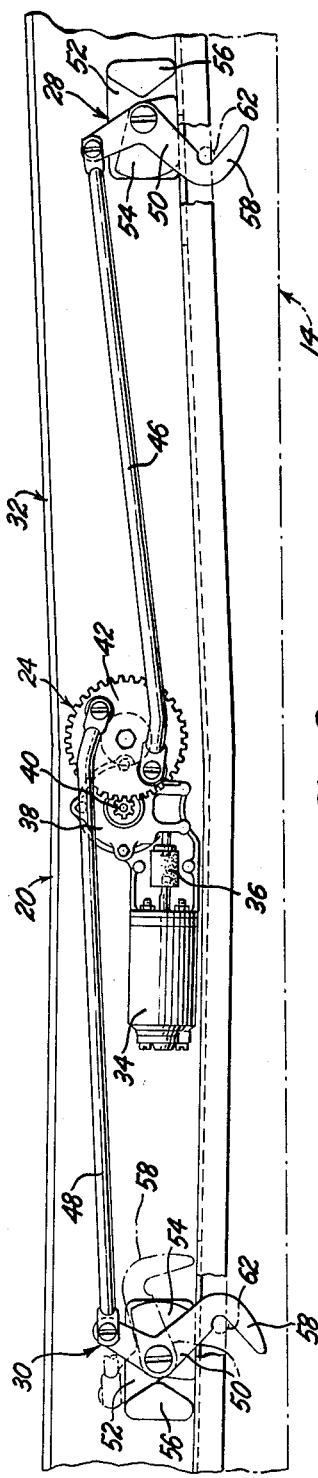
FIGURE 3 is a top plan view of the closure mechanism of this invention as seen substantially in the plane of line 3—3 of FIGURE 1 with certain parts broken away and removed for better illustration thereof.
Figure 4:
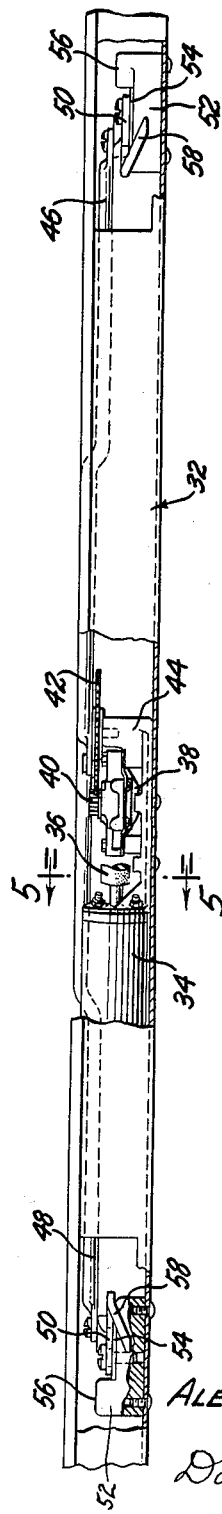
FIGURE 4 is a front plan view of the closure mechanism of this invention also having parts broken away, removed and shown in cross section to better illustrate certain features thereof.

Referring to FIGURES 3 and 4, a drive motor 34, which serves as the power source 22, identified in FIGURE 2, is mounted within the housing 32. The electrical power for the drive motor 34 may be provided through electrical leads provided within the framing members of the convertible top structure or elsewhere. The motor 34 is connected by a coupling 36 to a worm driven mechanism 38 including a sprocket or pinion gear 40 in driving engagement with a gear member 42. The gear member 42, is horizontally disposed, in the illustrated embodiment, and is rotatably mounted on a support 44. The drive motor 34 is selectively reversible and the gear member 42, which is part of the operative structure 24, identified in FIGURE 2, is alternately operable in clockwise and counterclockwise directions.

The connecting links 26 include rods 46 and 48 which are pivotally connected to the gear member 42 at an eccentrically disposed position relative to the axis of rotation thereof. It will also be noted that the connecting rods are respectively engaged on diametrically opposite sides of the axis of rotation of the gear member.

The connecting rods 46 and 48 are respectively engaged to the latching devices or catches 28 and 30. The catches 28 and 30 include bell crank lever arms 50 which are pivotally mounted on supporting blocks 52. The supports 52 include wear plates 54 and are formed to provide stop shoulders 56. The lever arm members 50, and the supporting block 52, of the catches 28 and 30, are mirror-image structures. Each includes a hook end 58 which is formed to obtain a camming action by being bent out of the plane thereof; as best shown by FIGURES 4 and 5.

Figure 5:
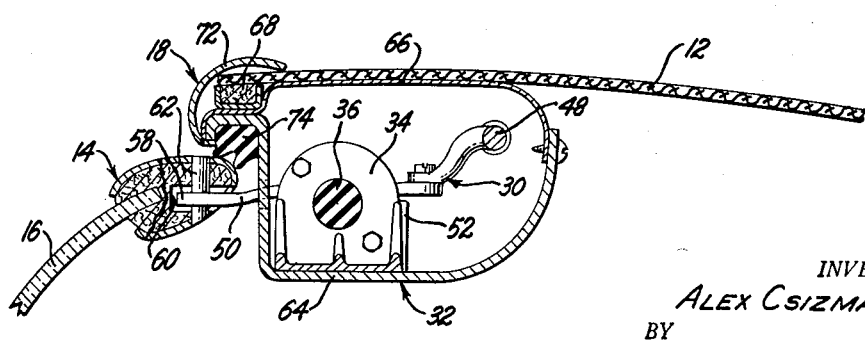
FIGURE 5 is a cross sectional view through the convertible top and windshield header bar, as seen substantially in the plane of line 5—5 of FIGURE 4, and enlarged to better illustrate certain structural features.

The windshield header bar 14 of the vehicle using the disclosed closure mechanism is shown by FIGURE 5 to include recesses 60 which are provided therein and are receptive of the engaging ends 58 of the catches 28 and 30. The hook ends 58 actually engage anchor pins 62 which are provided within the recesses 60. As the lever arm hooks extend further into the recesses 60 the top structure is drawn towards the header bar and is cammed into weathertight sealing engagement therewith.

With further reference to FIGURE 5, the housing structure 32 will be noted to include a die cast lower and side wall portion 64 which is closed by a cover member 66. Both are secured to the leading bow 68 of the convertible top structure; which member is also receptive of the cloth or soft top covering 12 and of the ornamental molding strip 72. A weather seal 74 is provided within the protection of the molding strip 72 and the housing 32 for sealing engagement with the windshield header bar 14.

The closure mechanism 20 may be separately actuated or may be integrally coordinated with the power mechanism which raises and lowers the convertible top 12. In either instance, the drive motor 34 is actuated to rotate the gear member 42 which operates the connecting rods 46 and 48 that are engaged to the catches 28 and 30 respectively.

When the gear member 42 is rotated in one direction the bell crank lever arms 50 are retracted within the housing structure 32. The shoulder stops 56 limit the travel of the lever arms 50 and prevent full rotation of the gear member 42 which might otherwise cause the connecting rods 46 and 48 to overlap and hang-up.

When the drive motor 34 is operated in a reverse direction the gear member 42 is rotated in the opposite direction and the connecting rods 46 and 48 cause the lever arms 50 to extend the hook ends 58 thereof beyond the housing for engagement with the anchor pins 62 provided within the header bar recesses 60. As the hooks are received about the anchor pins 62 the leading edge 18 of the convertible top 12 is drawn into engagement with the windshield header bar 14 in a co-planar closing movement such that the weather strip 74 is disposed in weather sealing engagement therebetween.

It will be appreciated that the closure mechanism 20 occupies a minimum of space and is non-obstructive of the visibility through the windshield 16. Further, the entire structure is carried by the convertible top mechanism, in the illustrated embodiment, and leaves no protuberances on the windshield header bar 14 when the convertible top 12 is disengaged therefrom and retracted within the vehicle body.

I claim:

A power operated latch mechanism for folding tops of convertible vehicles, and comprising:

a top header formed to provide an elongated and shallow housing for overlapping and abutting engagement with a windshield header bar, a latch mechanism provided in said top header and including bell crank latch members provided near opposite ends of said housing and extendable through the abutting face thereof for latching engagement with means provided on said windshield header bar, said windshield header bar including latch receptive slots having pin means provided therein and receptive of said latch members in engagement therewith, said latch members having a compound cam surfaced end engaging said pin and for pulling said housing down and into sealing engagement with said windshield header bar, means for mounting said latch members in said housing and including limit stops for the full retracted positioning of said latch members therein, latch operating means provided centrally in said housing and operatively connected to the inner disposed ends of said latch members, said operating means including a gear member, a pinion gear in peripheral and driving engagement with said gear member, a drive motor operatively connected to said pinion gear, and extended latch operating members pivotally engaged to said gear member on diametrically opposite sides thereof and to the inner ends of said latch members, said latch members being synchronously and positively operable by said gear member through said latch operating members and said limit stops precluding over center travel of said latch operating members in the rotation of said gear member and the actuation thereof.

References Cited in the file of this patent

UNITED STATES PATENTS

| | | |
|---|---|---|
| 2,586,648 | Hale et al. | Feb. 19, 1952 |
| 2,831,718 | Hallek et al. | Apr. 22, 1958 |
| 2,852,292 | Gala | Sept. 16, 1958 |
| 2,889,609 | Eisenhard et al. | June 9, 1959 |
| 2,898,138 | Van Noord | Aug. 4, 1959 |
| 2,916,317 | Diday | Dec. 8, 1959 |
| 2,916,327 | Gilson | Dec. 8, 1959 |
| 2,993,731 | Miles | July 25, 1961 |